(12) United States Patent
Nakamura et al.

(10) Patent No.: US 8,991,594 B2
(45) Date of Patent: Mar. 31, 2015

(54) CONVEYOR BELT WEAR DETECTION APPARATUS

(75) Inventors: Tomoki Nakamura, Yokohama (JP); Toshiki Sakaguchi, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 420 days.

(21) Appl. No.: 13/509,202

(22) PCT Filed: Nov. 11, 2010

(86) PCT No.: PCT/JP2010/006643
§ 371 (c)(1),
(2), (4) Date: Aug. 7, 2012

(87) PCT Pub. No.: WO2011/058755
PCT Pub. Date: May 19, 2011

(65) Prior Publication Data
US 2012/0306481 A1    Dec. 6, 2012

(30) Foreign Application Priority Data

Nov. 11, 2009  (JP) .................................. 2009-258101

(51) Int. Cl.
*B65G 43/02*   (2006.01)

(52) U.S. Cl.
CPC .................................... *B65G 43/02* (2013.01)
USPC ........................ 198/810.02; 324/228; 340/676

(58) Field of Classification Search
USPC ............ 198/810.01, 810.02, 810.03, 810.04, 198/844.1; 324/209, 219, 228; 340/676
See application file for complete search history.

(56) References Cited

U.S. PATENT DOCUMENTS

| | | | | |
|---|---|---|---|---|
| 3,750,129 A | * | 7/1973 | Takeno et al. | 198/810.02 |
| 4,020,945 A | * | 5/1977 | Takeno et al. | 198/810.02 |
| 5,923,165 A | * | 7/1999 | Horita et al. | 324/239 |
| 6,715,602 B1 | * | 4/2004 | Gartland | 198/810.02 |
| 7,187,151 B2 | * | 3/2007 | Itoh et al. | 318/474 |
| 7,347,317 B2 | * | 3/2008 | Aizawa et al. | 198/810.02 |
| 7,494,004 B2 | * | 2/2009 | Stolyar et al. | 198/810.02 |
| 7,748,521 B2 | * | 7/2010 | Aizawa et al. | 198/810.03 |
| 7,766,157 B2 | * | 8/2010 | Nishikita | 198/810.02 |

(Continued)

FOREIGN PATENT DOCUMENTS

| | | |
|---|---|---|
| CN | 101277882 A | 10/2008 |
| WO | 2007/029698 A1 | 3/2007 |
| WO | 2009/028667 A1 | 3/2009 |

OTHER PUBLICATIONS

Chilean Office Action, dated May 23, 2014, issued in corresponding Chilean Patent Application No. 1224-2012.

(Continued)

Primary Examiner — Douglas Hess
(74) Attorney, Agent, or Firm — Sughrue Mion, PLLC (57) ABSTRACT

A rubber magnet (3) includes a plate-like diagonal portion (21) and a plate-like parallel portion (22) which are both magnetized in a thickness direction, the diagonal portion (21) extending in a conveyor belt width direction while linearly extending, in section in a conveyor belt length direction, from an outer side end (3*b*), which is closer to the front-side surface (2*a*), to an inner side end (3*a*), which is away from the front-side surface (2*a*), while being at an angle to the front-side surface (2*a*), the parallel portion (22) being formed continuously from the inner side end (3*a*) of the diagonal portion, so as to be arranged parallel to the front-side surface (2*a*).

4 Claims, 9 Drawing Sheets

(56) References Cited

U.S. PATENT DOCUMENTS

| | | | |
|---|---|---|---|
| 7,810,634 B2 * | 10/2010 | Wallace et al. | 198/810.02 |
| 8,330,452 B2 * | 12/2012 | Furukawa | 324/207.11 |
| 8,558,541 B2 * | 10/2013 | Furukawa et al. | 324/228 |
| 8,657,105 B2 * | 2/2014 | Twigger et al. | 198/810.01 |
| 8,662,290 B2 * | 3/2014 | Twigger et al. | 198/810.01 |

OTHER PUBLICATIONS

Australian Office Action, dated Jan. 22, 2013, issued in corresponding Australian Application No. 2010318459.

International Search Report of PCT/JP2010/006643, dated Dec. 7, 2010.

Chinese Office Action, dated Nov. 21, 2013, issued in corresponding Chinese Patent Application No. 201080058015.3.

* cited by examiner

CONVEYOR BELT WEAR DETECTION APPARATUS

CROSS REFERENCE TO RELATED APPLICATION

This application is a National Stage of International Application No. PCT/JP2010/006643 filed Nov. 11, 2010, claiming priority based on Japanese Patent Application No. 2009-258101 filed Nov. 11, 2009, the contents of all of which are incorporated herein by reference in their entirety.

TECHNICAL FIELD

The present invention relates to a conveyor belt wear detection apparatus which includes a rubber magnet embedded in a conveyor belt, a magnetic sensor which is disposed in proximity to the front-side surface forming an outer peripheral surface of the conveyor belt and detects a magnetic field from the rubber magnet, and an arithmetic section for estimating, based on a signal from the magnetic sensor, a wear amount on the front-side surface of the conveyor belt, and more particularly, to a conveyor belt wear detection apparatus capable of detecting a wear amount even when the wear amount is closer to the wear limit.

RELATED ART

Figure 1:
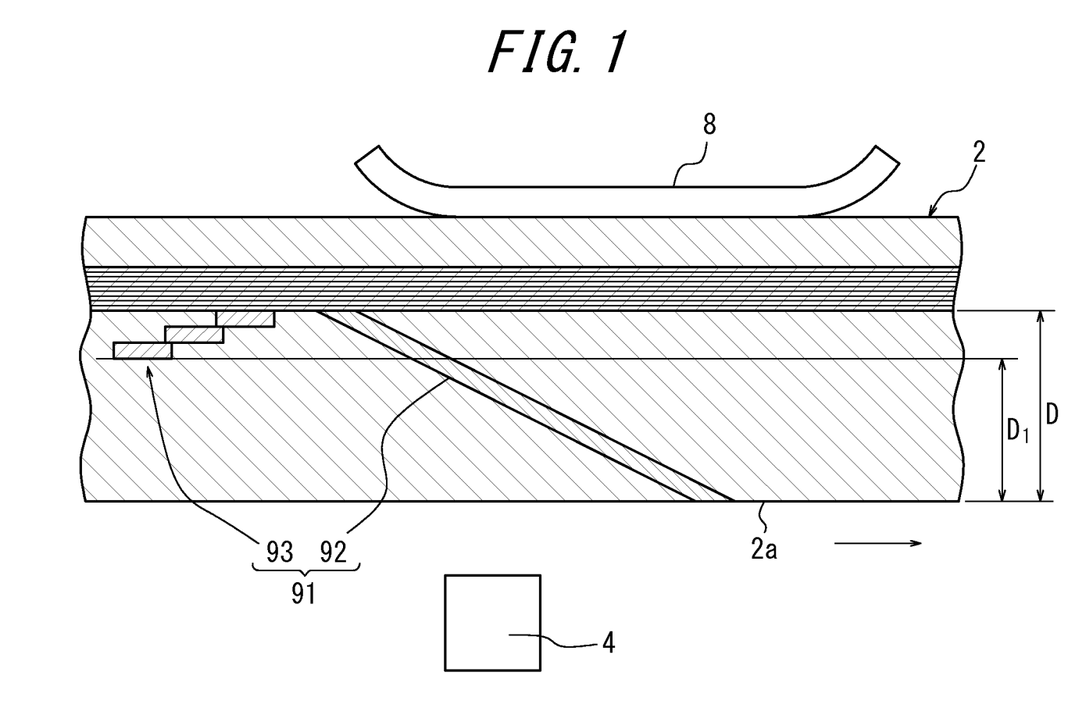
[FIG. 1] A sectional view of a conveyor belt in a conventional conveyor belt wear detection apparatus.

In doing maintenance of a conveyor belt for successively transporting an object such as charcoal, it is extremely important to detect and monitor a wear amount on a front-side surface of the conveyor belt because the front-side surface forming an outer peripheral surface that comes into direct contact with the object to be transported is subjected wear that advances with time due to friction against the object to be transported, which eventually makes the belt unusable. As an apparatus for detecting and monitoring the wear amount, there has been proposed, as illustrated in FIG. 1 showing a conveyor belt in section, an apparatus which includes: a rubber magnet 91 embedded in a conveyor belt 2; a magnetic sensor 4 which is disposed in proximity to a front-side surface 2a of the conveyor belt 2 and detects a magnetic field from the rubber magnet 91; and an arithmetic section for estimating, based on a signal from the magnetic sensor 4, a wear mount of the front-side surface 2a of the conveyor belt 2 (see, for example, Patent Document 1).

Then, the rubber magnet 91 includes a diagonal magnet 92 and a stair-like magnet 93. In section in a conveyor belt length direction, the diagonal magnet 92 is at an angle to the front-side surface 2a while linearly extending from an outer-side end, which is closer to the front-side surface 2a, to an inner-side end, which is away from the front-side surface 2a, and the stair-like magnet 93 includes a plurality of plate-like magnets which are arranged in a staircase pattern at substantially the same position as the inner-side end of the diagonal magnet 92 in the thickness direction as being parallel to the front-side surface 2a.

Figure 2:
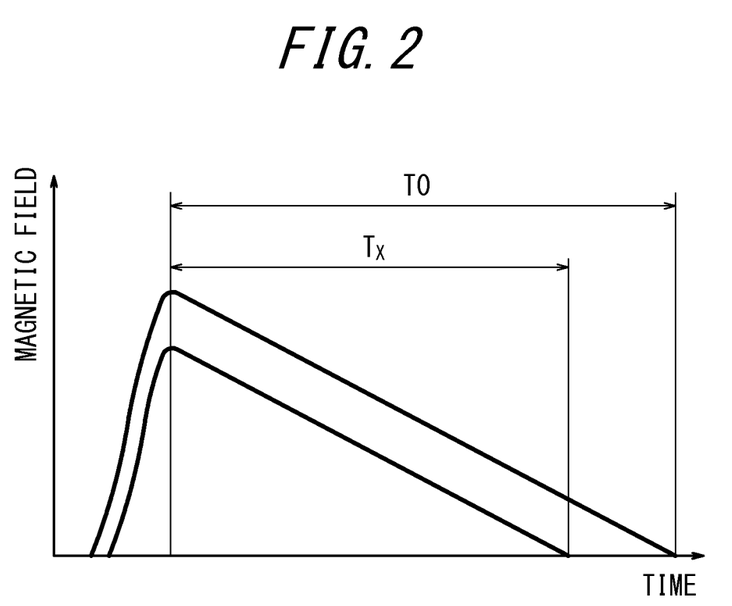
[FIG. 2] An output waveform chart of a magnetic sensor in the conventional conveyor belt ware detection apparatus.

The apparatus is configured to estimate the wear amount based on the time variation pattern of a magnetic field of the diagonal magnet 92 until the wear amount reaches D1 at which the stair-like magnet is exposed on the front-side surface 2a. Specifically, FIG. 2 shows a time variation pattern of a magnetic field detected by the magnetic sensor 4, including a time T from a time t1 corresponding to the peak of the magnetic field to a time t0 at which the magnetic field becomes zero. Using the fact that the time T decreases by a length proportional to the wear amount, the apparatus is configured to obtain, based on the time upon wear detection (T=Tx) and the time at which the wear is zero (T=T0), the wear amount as D multiplied by (1−Tx/T0), that is, D*(1−Tx/T0), in which D represents the length of the diagonal magnet 92 extending in the conveyor belt thickness direction.

Then, in the apparatus, when the wear is advanced further enough to expose the stair-like magnet 93 on the surface, the diagonal magnet 92 is diminished in length, resulting in weakening of the magnetic field from the diagonal magnet 92, which may leads to a failure in detection and a deterioration in accuracy. In this case, the apparatus estimates the wear amount based on a magnetic force pattern from the stair-like magnet 93. The reason is that the stair-like magnet 93 is large in magnet volume relative to a distance extending in a conveyor belt thickness direction, and therefore has a strong magnetic force. The stair-like magnet 93 has a time variation pattern that changes stepwise according to the shape of the stair-like magnet 93, and hence, the degree of wear can be determined based on the number of stairs.

PRIOR ART DOCUMENT

Patent Document

Patent Document 1: Japanese Patent Translation Publication No. 2007-029698

DISCLOSURE OF THE INVENTION

Problems to be Solved by the Invention

However, it has been found that the stair-like magnet 93 involves problems as follows. That is, in addition to the fact that the magnet material is more susceptible to wear as compared to the surrounding rubber portion, the stair-like magnet 93 has, in particular, a large surface parallel to the front-side surface of the conveyor belt, and hence, wear develops more intensively in the stair-like magnet 93 as compared to the surrounding rubber portion when the stair-like magnet 93 is exposed on the front-side surface, with the result that the time variation pattern of a magnetic field obtained from the stair-like magnet 93 does not accurately represent the wear in the rubber portion.

The present invention has been made in view of the above-mentioned problems, and therefore, the object of the invention is to provide a conveyor belt wear detection apparatus for estimating a wear amount of a conveyor belt, based on a time variation pattern of a magnetic field obtained from a rubber magnet embedded in the conveyor belt which diminishes along with the advance of wear in the conveyor belt, the conveyor belt wear detection apparatus being capable of estimating the wear amount with accuracy even when the wear develops to a large degree.

Means for Solving the Problem

In order to attain the above-mentioned object, a conveyor belt wear detection apparatus according to the present invention includes:

a rubber magnet embedded in a conveyor belt;

a magnetic sensor which is disposed in proximity to a front-side surface forming an outer peripheral surface of the conveyor belt and detects a magnetic field from the rubber magnet; and an arithmetic section for estimating, based on a signal from the magnetic sensor, a wear amount on the front-side surface of the conveyor belt, in which the rubber magnet extends in a conveyor belt width direction and includes a diagonal portion in a plate shape and a parallel portion in a plate shape which are both magnetized in a thickness direction, the diagonal portion linearly extending, in section in a conveyor belt length direction, from an outer side end, which is closer to the front-side surface, to an inner side end, which is away from the front-side surface, while being at an angle to the front-side surface, the parallel portion being formed continuously from the inner side end of the diagonal portion and being arranged parallel to the front-side surface.

Further, in the conveyor belt wear detection apparatus according to another aspect of the present invention, the diagonal portion is disposed so that the inner side end comes ahead of the outer side end with respect to a conveyor belt transport direction.

Still further, in the conveyor belt wear detection apparatus according to further another aspect of the present invention, the arithmetic section estimates a wear amount of the conveyor belt upon detection of a magnetic field, based on a ratio (Rx/R0) of a waveform width Rx to an initial waveform width R0, in which the waveform width Rx, namely, a waveform detection time, is obtained, in a time variation pattern of a magnetic field detected by the magnetic sensor, at a threshold value predetermined as a specific sensor output value and the initial waveform width R0 is obtained at the threshold value in the time variation pattern detected for the conveyor belt that has not been subjected to wear.

Yet further, the conveyor belt wear detection apparatus according to still another aspect of the present invention further includes a reference magnet for correcting a waveform width of an output waveform detected by the rubber magnet, the reference magnet being disposed either on the front side or on the rear side of the rubber magnet in a conveyor belt transport direction.

Furthermore, in the conveyor belt wear detection apparatus according to yet another aspect of the present invention, the rubber magnet is formed of magnetic powder which is dispersed in a rubber material matrix and magnetized.

Effect of the Invention

According to the conveyor belt wear detection apparatus of the present invention, the rubber magnet includes a plate-like diagonal portion and a plate-like parallel portion which are both magnetized in a thickness direction, the diagonal portion extending in a conveyor belt width direction while linearly extending, in section in a conveyor belt length direction, from an outer side end, which is closer to the front-side surface, to an inner side end, which is away from the front-side surface, while being at an angle to the front-side surface, the parallel portion being formed continuously from the inner side end of the diagonal portion and being arranged parallel to the front-side surface. With this configuration, due to the magnet volume of the parallel portion, there can be generated a magnetic field that is strong enough to be detected by the magnetic sensor even until the diagonal portion is almost worn away. Therefore, the degree of advance of the wear can be estimated with accuracy even when excessive wear is underway.

Further, in the conveyor belt wear detection apparatus according to another aspect of the present invention, the diagonal portion is disposed so that the inner side end comes ahead of the outer side end with respect to a conveyor belt transport direction. With this configuration, even when the rubber peels off from the magnet from the outer-side end of the diagonal portion during running of the conveyor belt, the peeled area can be suppressed to minimum.

Still further, in the conveyor belt wear detection apparatus according to further another aspect of the present invention, the arithmetic section can estimate with high accuracy, upon detection of a magnetic field, the thickness of the conveyor belt having undergone wear from the front-side surface, by using, for example, a function $D=f(Rx/R0)$ between a thickness D of the conveyor belt and a ratio (Rx/R0) of a waveform width Rx to an initial waveform width R0, which is obtained in advance from experiment, based on the ratio (Rx/R0) of the waveform width Rx to an initial waveform width R0, in which the waveform width Rx is obtained, in a time variation pattern of a magnetic field detected by the magnetic sensor, at a threshold value predetermined as a specific sensor output value and the initial waveform width R0 is obtained at the threshold value in a time variation pattern detected for the conveyor belt that has not been subjected to wear.

Yet further, the conveyor belt wear detection apparatus according to another aspect of the present invention further includes a reference magnet for correcting a waveform width of an output waveform detected by the rubber magnet, the reference magnet being disposed either on the front side or on the rear side of the rubber magnet in a conveyor belt transport direction. The reference magnet is capable of correcting a waveform width of an output waveform detected from the rubber magnet, to thereby ensure the accuracy of the measurement result without deteriorating the measurement accuracy.

Furthermore, in the conveyor belt wear detection apparatus according to yet another aspect of the present invention, the rubber magnet is formed of magnetic powder which is dispersed in a rubber material matrix and magnetized. Therefore, the rubber magnet is capable of flexibly following deformation of the conveyor belt which is deformed during use, to thereby ensure durability while maintaining a strong magnetic force.

BEST MODES FOR CARRYING OUT THE INVENTION

First Embodiment

Figure 3:
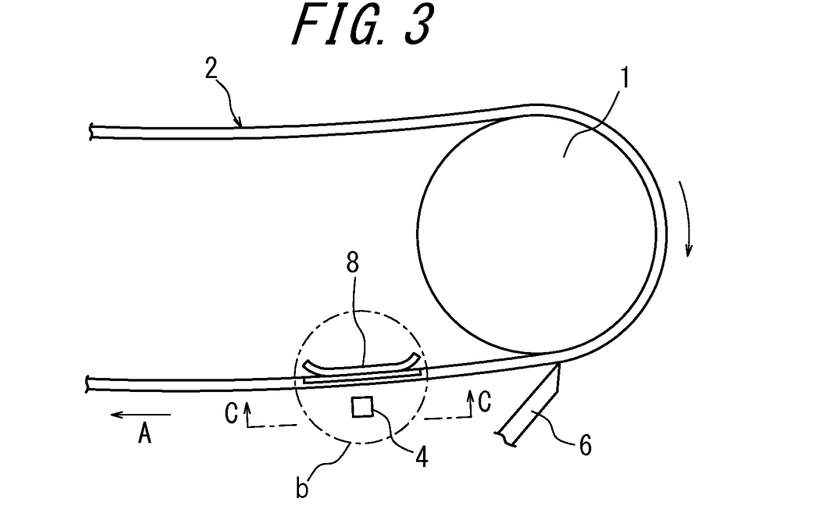
[FIG. 3] A side view of a conveyor belt in a conveyor belt wear detection apparatus according to a first embodiment of the present invention.
Figure 4:
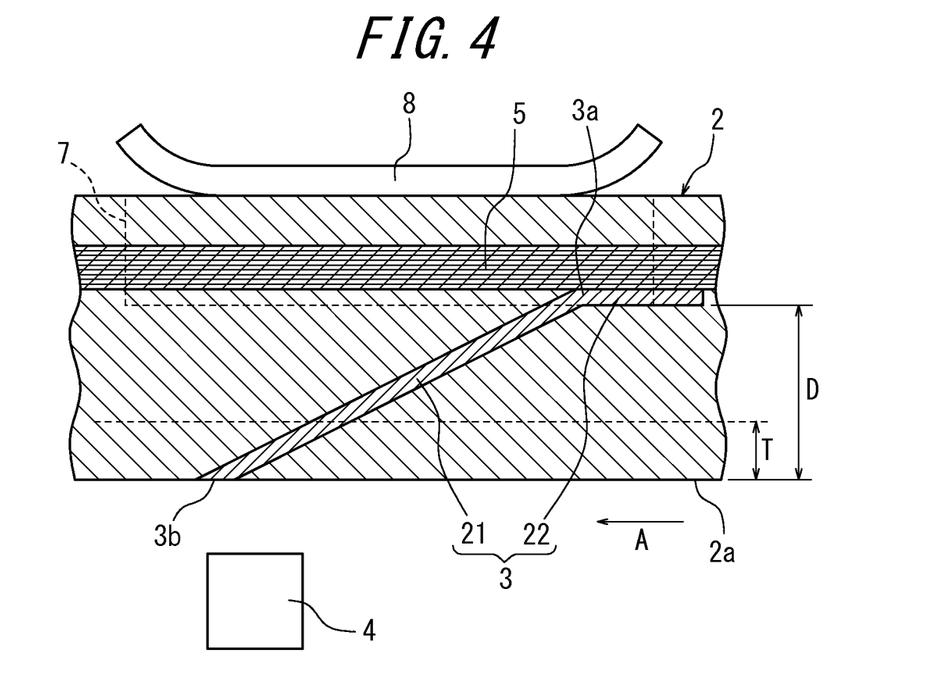
[FIG. 4] An enlarged sectional view of a portion b of FIG. 3.
Figure 5:
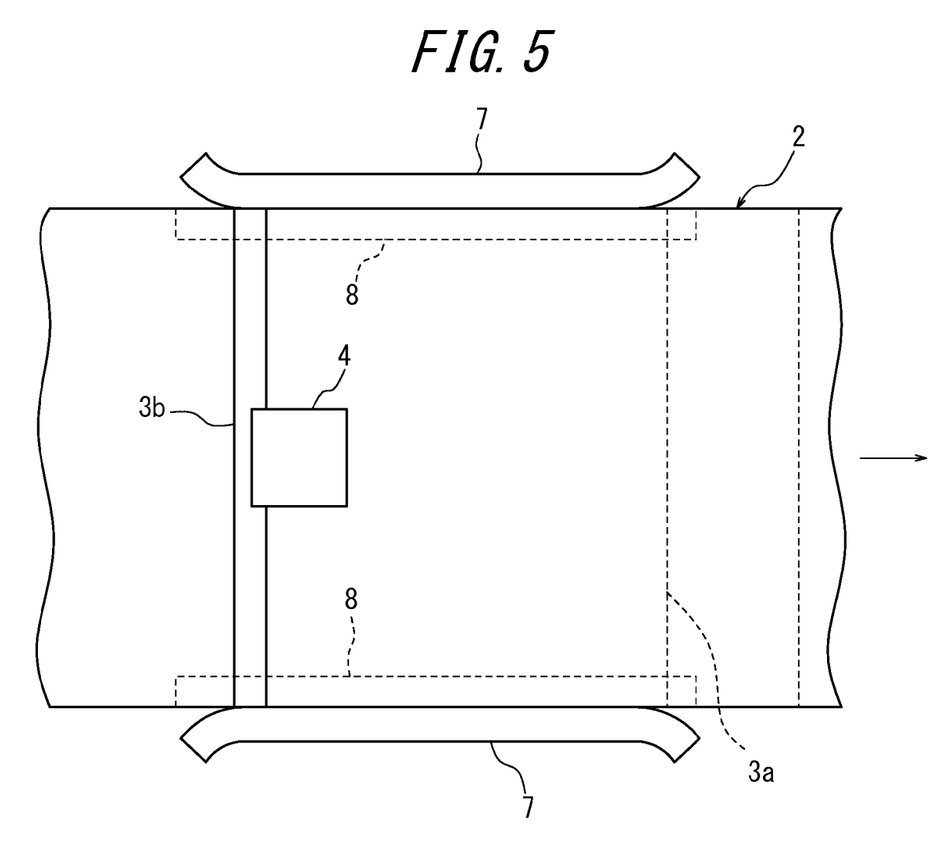
[FIG. 5] A view taken along the arrow C-C in FIG. 3.

In the following, embodiments of the present invention are described with reference to the drawings. FIG. 3 is side view of a conveyor belt in a conveyor belt wear detection apparatus according to a first embodiment of the present invention, FIG. 4 is an enlarged sectional view of the portion b of FIG. 3, and FIG. 5 is a view taken along the arrow C-C in FIG. 3.

The wear detection apparatus includes: a rubber magnet 3, which is embedded on a front-side surface 2a side of a conveyor belt 2 looped around a pulley 1; and a magnetic sensor 4, which is disposed in proximity to the front-side surface 2a and detects a magnetic field from the rubber magnet 3.

The rubber magnet 3 extends in a conveyor belt width direction and includes a plate-like diagonal portion 21 and a plate-like parallel portion 22, which are both magnetized in the thickness direction. The diagonal portion 21 linearly extends, in section in a conveyor belt length direction, from an outer side end 3b, which is closer to the front-side surface 2a, to an inner side end 3a, which is away from the front-side surface 2a, while being at an angle to the front-side surface 2a. The parallel portion 22 is formed continuously from the inner side end 3a of the diagonal portion 21, and is arranged parallel to the front-side surface 2a. The diagonal portion 21 is disposed so that the outer side end 3b comes ahead of the inner side end 3a with respect to the conveyor belt transport direction (indicated by the arrow in the drawing). Then, the rubber magnet 3, which is in the sectional shape of FIG. 4, is embedded across the entire width direction of the conveyor belt 2.

Here, the rubber magnet 3 may preferably have the outer side end 3b of the diagonal portion 21 exposed on the front-side surface 2a from the start of use, and also have the parallel portion 22 in contact with the reinforcement 5 of the conveyor belt 2. With this configuration, the degree of wear can be detected across a wide area from the initial stage of wear.

As the rubber magnet 3, there may be suitably employed a sheet-shaped bond magnet magnetized in the thickness direction, which is formed of magnetic powder dispersively mixed in a rubber matrix. A bond magnet configured as described above can be made thin, and also offer great flexibility sufficient enough to follow deformation of the conveyor belt with ease.

Ferrite may be generally used as the magnet powder. Alternatively, however, a rare-earth magnet made from an alloy of neodymium, iron, and boron, or an alloy of samarium, iron, and nitride, or an alnico magnet may also be used so that the magnet can be given a strong magnetic force.

The magnetic sensor 4 may be a gauss meter, a loop coil, an MI sensor, or the like, and is disposed in closest proximity to a position where the rubber magnet 3 passes through. The magnetic sensor 4 may preferably be mounted on the return side of the conveyor belt 2 as illustrated in FIGS. 3 and 4. With this configuration, detection can be performed at a position cleaned by a scraper 6 scraping off a transported object conveyed by the conveyor belt 2.

As illustrated in FIG. 5, width direction guides 7 are provided in the vicinity of the magnetic sensor 4, the width direction guides 7 restricting the position of the conveyor belt 2 in the width direction. Provided on the other side of the magnetic sensor 4 are thickness direction guides 8 for maintaining a constant positional relation between the conveyor belt 2 and the magnetic sensor 4.

Figure 6:
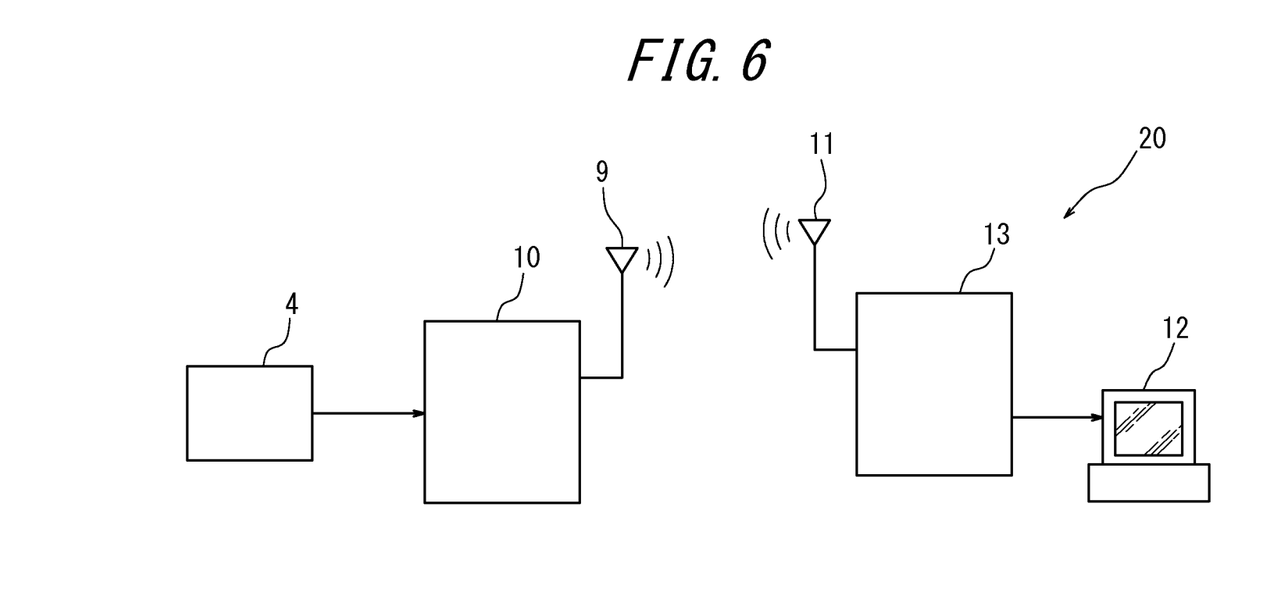
[FIG. 6] A block diagram of an arithmetic section.

FIG. 6 illustrates an example of an arithmetic section 20 of the wear detection apparatus of the conveyor belt 2. As illustrated in the drawing, the arithmetic section 20 includes an on-site operation control unit 10 and a central control unit 13. The on-site operation control unit 10 receives a detection signal input from the magnetic sensor 4, calculates the degree of wear of the belt, and transmits, via a transmitter 9, the calculation result. The central control unit 13 receives, via a receiver 11, a signal transmitted thereto, transmits the calculation result to an output terminal 12, and also performs necessary processing such as issuing a warning and stopping the operation of the conveyor belt 2 when the degree of wear has exceeded a predetermined threshold value.

Second Embodiment

Figure 7:
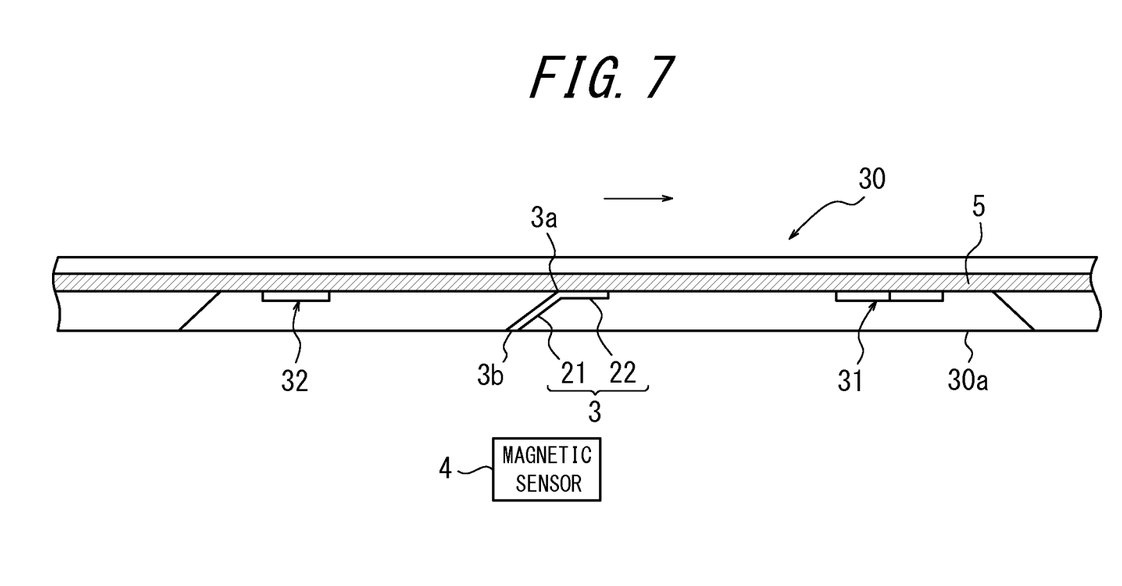
[FIG. 7] A schematic sectional view along a belt longitudinal direction of a conveyor belt according to a second embodiment of the present invention.

FIG. 7 is a sectional view along a belt longitudinal direction of a conveyor belt according to a second embodiment of the present invention. As illustrated in FIG. 7, a conveyor belt 30 has a configuration similar to that of the conveyor belt 2 of the first embodiment (see FIG. 4), except that the conveyor belt 30 has, on both sides thereof in the belt longitudinal direction, a trigger magnet 31 and a reference magnet 32 which are disposed as being in close contact with the reinforcement 5 as a core of the belt and embedded on the front-side surface 30a side.

Here, the trigger magnet 31 is arranged ahead of the rubber magnet 3 in the conveyor belt transport direction, so as to have, for example, the south pole on the front side in the belt transport direction and the north pole on the rear side in the belt transport direction. As a result, during running of the conveyor belt 30, the trigger magnet 31 passes through, ahead of the rubber magnet 3, a magnetic field detection area by the magnetic sensor 4, namely, a position opposed to the magnetic sensor 4.

The trigger magnet 31 functions as a trigger for the magnetic sensor 4 to start detecting the magnetic field of the rubber magnet 3 upon the magnetic sensor 4 detecting the magnetic field of the trigger magnet 31.

Meanwhile, as illustrated in the drawing, the reference magnet 32 is disposed posterior to the rubber magnet 3 in the conveyor belt transport direction. As a result, during running of the conveyor belt 30, the reference magnet 32 passes through, after the rubber magnet 3, the magnetic field detection area by the magnetic sensor 4, namely, a position opposed to the magnetic sensor 4.

Figure 8:
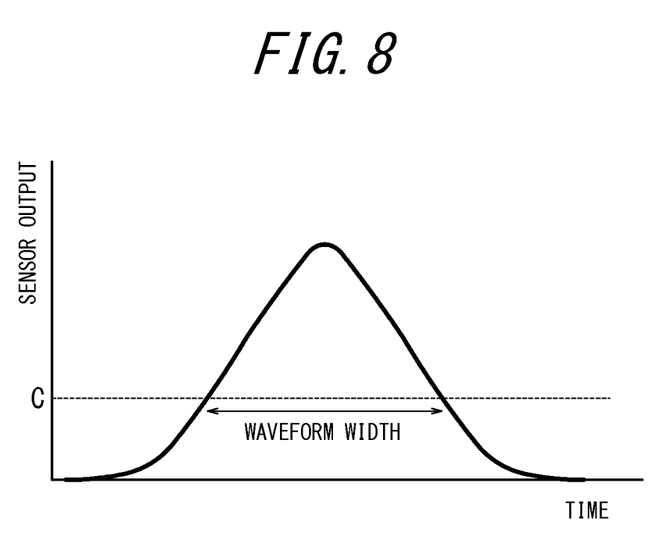
[FIG. 8] A graph schematically showing a waveform width of an output waveform from a rubber magnet, the waveform width being corrected using a reference magnet.

An output waveform from the rubber magnet 3 is susceptible to variation as being affected by various variation factors such as an offset distance between the magnetic sensor 4 and the rubber magnet 3 and a transport speed of the conveyor belt 30 upon waveform detection. With the use of the reference magnet 32 thus provided, a waveform width, which is exemplified in FIG. 8, of the output waveform from the rubber magnet 3 can be corrected, to thereby improve the measurement accuracy.

Here, a waveform width of the sensor output value detected by the magnetic sensor 4 from the rubber magnet 3 can be corrected by the reference magnet 32 as follows. That is, with each detection of the magnetic field of the rubber magnet 3, an always-constant magnetic field generated by the reference magnet 32 is also detected, the reference magnet 32 being less likely to be subjected to wear as being embedded inside the conveyor belt 30. For example, the rubber magnet 3, which is new and exhibits no wear, is subjected to a first waveform width measurement, during which the waveform width of the reference magnet 32 is also measured. Further, after a lapse of a certain period of time from the first waveform width measurement, the rubber magnet 3 and the reference magnet 32 are each subjected to a second waveform width measurement. Thereafter, along with the further advance of wear of the conveyor belt 30, third and subsequent waveform width measurements are similarly performed respectively.

Then, as shown in Table 1, with reference to the waveform width of the waveform output from the reference magnet 32 in the first measurement, which is obtained at an arbitrary sensor output value C, the rate of change of the waveform width of the reference magnet 32 in the second measurement with respect to the waveform width in the first measurement is defined as a waveform width retention rate. Based on the waveform width retention rate, the waveform width of the waveform output from the rubber magnet 3 in the second measurement is corrected, to thereby correct the waveform width of the rubber magnet 3.

The waveform width of the rubber magnet 3 in the third and subsequent measurement can be similarly corrected through calculation of the waveform width retention rate with reference to the waveform width of the reference magnet 32 in the first measurement.

Specifically, a corrected waveform width of the rubber magnet 3 can be calculated from the following equation.

a corrected waveform of the rubber magnet 3=an uncorrected waveform width of the rubber magnet 3/the waveform retention rate of the reference magnet 32

TABLE 1

| | Measurement count | | | |
|---|---|---|---|---|
| | First | Second | Third | Fourth |
| Uncorrected Waveform Width of Rubber Magnet 3 (0.001 s) | 5000 | 4000 | 3000 | 2000 |
| Waveform Width Retention Rate of Reference Magnet 32 (%) | 100 | 105 | 102 | 98 |
| Corrected Waveform Width of Rubber Magnet 3 (0.001 s) | 5000 | 4000/1.05 | 3000/1.02 | 2000/0.98 |

Therefore, with the use of the reference magnet 32 thus provided, a waveform width of the rubber magnet 3 can be corrected based on the waveform width retention rate of the reference magnet 32, and thus, even when the waveform width of the sensor output is fluctuated due to changes in distance between the magnetic sensor 4 and the rubber magnet 3 and in belt transport speed of the conveyor belt 30 at the time of measurement, deviations in the output waveform resulting from the fluctuation can be corrected as described above, so as to constantly obtain an accurate measurement result, to thereby advantageously eliminate the fear of reduction in measurement accuracy.

The reference magnet 32 needs to be disposed at a certain distance from each of the rubber magnet 3 and the trigger magnet 31 so as not to cause interference with the magnetic field of the rubber magnet 3 or with the magnetic field of the trigger magnet 31. Although not shown, however, the reference magnet may be disposed ahead of the rubber magnet in the conveyor belt transport direction.

Further, the present invention is not limited to the case where the reference magnet 32 is embedded on the front-side surface 30a side where the trigger magnet 31 and the rubber magnet 3 are arranged. Alternatively, the reference magnet 32 may be embedded, as being in close contact with the surface of the reinforcement, on the inner peripheral side (upper side in the drawing) of the conveyor belt 30, that is, the opposite side to the trigger magnet 31 and the rubber magnet 3 across the reinforcement 5.

The reference magnet 32 may preferably be formed thinner than the rubber magnet 3 so as not to be reduced in volume before reaching the belt wear limit at which the conveyor belt 30 should be replaced. With the reference magnet 32 being formed smaller in thickness as described above, the reference magnet 32 can still be covered in its surroundings by a rubber portion forming the conveyor belt 30 even at a point when the parallel portion 22 starts to be subjected to wear after the diagonal portion 21 of the rubber magnet 3 has been completely worn away, to thereby prevent the wear of the reference magnet 32 itself.

Specifically, when the reference magnet 32 has a thickness of t (for example, 1 mm), for example, the rubber magnet 3 is preferred to have a thickness of 1.5 t. In this case, the trigger magnet 31 may have a thickness of 3.0 t.

The above-mentioned trigger magnet 31 and reference magnet 32 may be provided as being embedded in the conveyor belt 30 in the following manner. That is, for example, an unvulcanized or vulcanized cover rubber of the conveyor belt is peeled off so as to leave a concave portion that expands in diameter in section, along the belt running direction, toward an upper opening, while exposing the reinforcement 5. The trigger magnet 31 and the reference magnet 32 are integrally formed with an unvulcanized rubber, together with the rubber magnet 3, as magnet-arranged rubber parts, which is fit into the concave portion. After that, the unvulcanized conveyor belt is vulcanized together with the magnet-arranged rubber parts, to thereby dispose the trigger magnet 31 and the reference magnet 32 in the conveyor belt 30 as being embedded therein.

It is sufficient that the rubber magnet 3, the trigger magnet 31, and the reference magnet 32 are disposed, as a set, on at least one part in a circumferential direction of the conveyor belt 30.

Next, description is given of a wear detection method in the conveyor belt 30.

Figure 9:
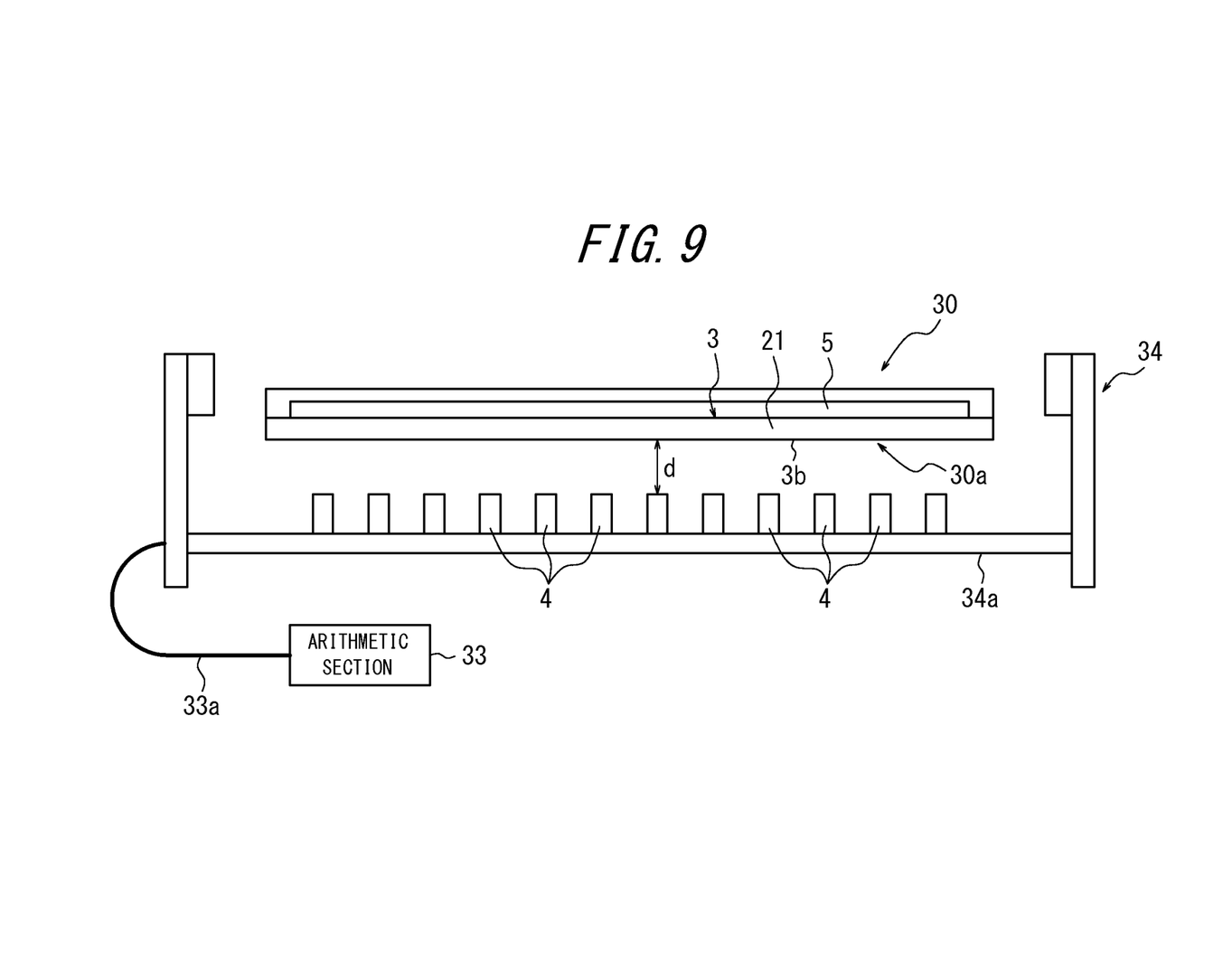
[FIG. 9] An explanatory view illustrating a schematic configuration in a belt width direction of a conveyor belt wear detection apparatus in which the conveyor belt of FIG. 7 is used.

FIG. 9 is an explanatory view illustrating a schematic configuration in the belt width direction of a conveyor belt wear detection apparatus using the conveyor belt of FIG. 7. The conveyor belt wear detection apparatus of FIG. 9 includes: the rubber magnet 3 arranged in the conveyor belt 30; the magnetic sensors 4 for detecting a magnetic field from the rubber magnet 3; and an arithmetic section 33 for calculating a belt wear amount based on a sensor output from the magnetic sensors 4.

Here, the plurality of magnetic sensors 4 are attached, at substantially equal intervals (for example, at a pitch of 50 mm) in the belt width direction, to a sensor fixing frame 34a disposed below a conveyor frame 34 which supports the conveyor belt 30 while allowing the belt to be freely movable. All the magnetic sensors 4, the number of which is set to 12 in this example, are each disposed so as to be opposed to the front-side surface 30a while being spaced apart from the front-side surface 30a at a predetermined distance d (for example, 60 mm).

The arithmetic section 33 may be configured similarly to the arithmetic section 20 of the first embodiment.

During running of the conveyor belt 30 of FIGS. 7 and 9, first, the trigger magnet 31 passes above the magnetic sensors 4, upon which the magnetic sensors 4 start detecting the magnetic field of the rubber magnet 3. Subsequently, the rubber magnet 3 passes above the magnetic sensors 4, upon which the magnetic sensors 4 detect the magnetic field generated by the rubber magnet 3. After that, the reference magnet 32 passes above the magnetic sensors 4.

Here, with the advance of wear of the conveyor belt 30 from the front-side surface 30a on which an object to be transported is placed during the conveyor transportation through running of the belt, the rubber magnet 3, which is diagonally arranged along the belt running direction from the reinforcement 5 side toward the front-side surface 30a, is subjected to wear from the outer side end 3b located on the front-side surface 30a side. Thus, along with the passage of time, the distance between the diagonal portion 21 of the rubber magnet 3 and the magnetic sensors 4 gradually increases, with the result the intensity of the magnetic field, which changes depending on the distance between the rubber magnet 3 and the magnetic sensors 4, becomes gradually weaker.

Figure 10:
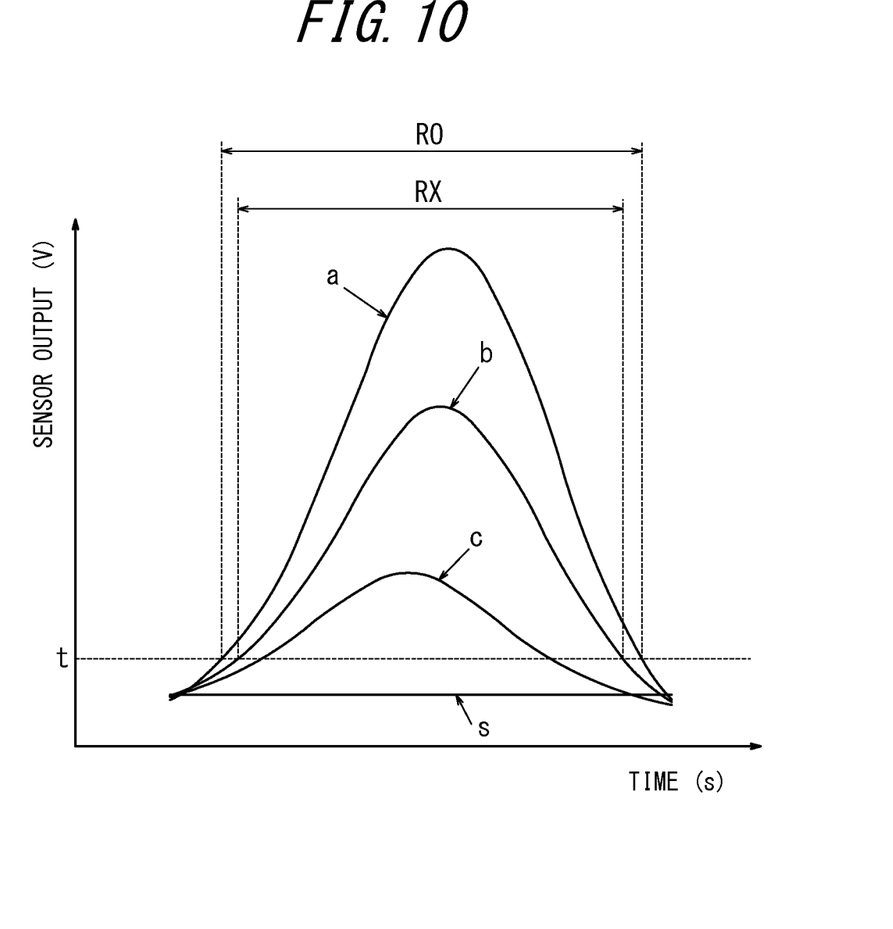
[FIG. 10] An explanatory diagram showing, in graph form, a sensor output associated with belt running of the conveyor belt of FIG. 7.

FIG. 10 is an explanatory diagram showing, in graph form, changes in sensor output along with the passage of time, in the use of the conveyor belt of FIG. 7. In FIG. 10, the abscissa and the ordinate each show the time [S] at which a magnetic field is detected, and the sensor output [V], respectively.

The graph in the drawing shows output waveforms of a sensor output value for a wear judgment portion, obtained from the magnetic sensors 4 each disposed as being spaced apart by 60 [mm] from the front-side surface 30a of the conveyor belt 30, in the conveyor belt 30 running at a speed of 20 [m/min].

The magnetic sensors 4 may detect a magnetic field every time the rubber magnet 3 passes above the magnetic sensors 4, or may detect a magnetic field once in several times. In addition, when the outer side end 3b of the rubber magnet 3 has not been exposed on the front-side surface 30a of the conveyor belt 30, the detection of a magnetic field may preferably be started after the front-side surface 30a has been worn off by a certain amount so as to have the outer side end 3b exposed thereon.

As shown in FIG. 10, the output waveforms from the magnetic sensor 4 each start to rise when the parallel portion 22 of the rubber magnet 3 comes closer to the magnetic sensors 4. The magnetic sensors 4 detect the magnetic field of the entire rubber magnet 3 as coming closer to the diagonal portion 21. As the outer side end 3b comes closer to the magnetic sensors 4, the output waveforms each draw an ascending curved line due to a reduction of the distance between the outer side end 3b and the magnetic sensors 4, and reach its peak indicating a maximum magnetic force at a point when the outer side end 3b passes above the magnetic sensors 4. Thereafter, as the outer side end 3b is distanced away from the magnetic sensors 4, the waveforms each draw a descending curved line due to an increase of the distance between the magnetic sensors 4 and the rubber magnet 3 opposing thereto.

Here, the output waveform s shows a state where the rubber magnet 3 including the diagonal portion 21 and the parallel portion 22 is completely worn away. The output waveforms a to c each show three output waveforms detected in a time period from a state where the diagonal portion 21 exhibits no wear (output waveform a) to a state where the diagonal portion 21 has underwent excessive wear (output waveform c), respectively. A specific sensor output value t which is larger than the sensor output value of the output waveform s represents a preset threshold value.

In the magnetic sensors 4 used herein, for example, the above-mentioned threshold value t may be set, with the sensor output value of 2.5 V being as a zero reference, to an output value falling within a range of 3.0 V to 4.0 V in the case where the reinforcement 5 is formed of a steel cord, and may be set to an output value falling within a range of 2.7 V to 3.0 V in the case where the reinforcement 5 is formed of canvas.

Then, the wear amount of the conveyor belt 30 can be estimated as follows based on the output waveform b detected by the magnetic sensor 4. That is, first, as illustrated in FIG. 10, a waveform width Rx at the preset threshold value t is measured. Specifically, measured is a waveform detection time period from a time when the output value of the output waveform b, which gradually increases at an early stage of detection, exceeds the threshold value t, to a time when the output value, which gradually decreases after reaching its peak, falls below the threshold value t.

Next, calculated is a ratio (Rx/R0) of the above-mentioned waveform width Rx with respect to an initial waveform width R0 of the output waveform a at the threshold value t in a state where the conveyor belt 30 exhibits no wear.

After that, for example, using a function D=f(Rx/R0) among a thickness D of the conveyor belt and the ratio (Rx/R0) of the waveform width Rx with respect to the initial waveform width R0, which is obtained through a preliminary wear test or the like, the thickness of the conveyor belt 30 corresponding to the specific numerical value of the ratio (Rx/R0) obtained from measured values is calculated, to thereby estimate the wear amount of the conveyor belt 30 at the time when the magnetic field is detected by the magnetic sensors 4.

Here, along with reduction in extending length in the conveyor belt length direction of the diagonal portion 21 diagonally extending from the outer side end 3b to the inner side end 3a, resulting from the advance of wear of the diagonal portion 21 associated with the wear on the front-side surface 30a of the conveyor belt 30, the waveform width Rx of a waveform detected by the magnetic sensors 4, that is, the waveform detection time is reduced. Therefore, when the thickness of the conveyor belt 30 is calculated based on the ratio (Rx/R0) of the waveform width Rx with respect to the initial waveform width R0, the wear of the conveyor belt 30 can be calculated with sufficiently high accuracy.

In this case, in detecting the wear of the conveyor belt 30, the rubber magnet 3 is provided with the parallel portion 22 that is formed continuously from the diagonal portion 21, thereby making it possible to reliably detect the magnetic field from the parallel portion 22, even in a state where almost no diagonal portion 21 remains along with the advance of wear of the rubber magnet 3, the parallel portion 22 extending in the conveyor belt length direction as being in close contact with the reinforcement 5. As a result, a failure in detection of a magnetic field resulting from the loss of the rubber magnet can be effectively prevented.

The reason is as follows. That is, in the case where the rubber magnet 3 only includes the diagonal portion 21, the wear of the diagonal portion 21 advances along with the advance of wear of the conveyor belt 30, and the magnetic field generated by the diagonal portion 21 becomes weak when the rubber magnet 3 remains only in the vicinity of the inner side end 3a, making it impossible to detect the magnetic field. Meanwhile, due to the parallel portion 22 formed continuously from the diagonal portion 21, a magnetic field from the parallel portion 22 which is provided in close contact with the reinforcement 5 as being parallel to the front-side surface 30a can still be detected even when almost no diagonal portion 21 remains, and the magnetic field thus detected can be output as a sensor output waveform.

Further, in detecting wear of the conveyor belt 30, the magnetic sensors 4 automatically detect the magnetic field upon the rubber magnet 3 passing over the magnetic sensor 4. Therefore, the thickness of the conveyor belt 30 and even the state of wear of the conveyor belt can be identified without stopping the running of the conveyor belt 30 to interrupt the transportation operation of the conveyor belt 30.

The wear detection method described herein can be similarly applied to the conveyor belt 2 of the first embodiment.

The present application claims priority from Japanese Patent Application No. 2009-258101 filed on Nov. 11, 2009, the content of which is entirely incorporated herein by reference.

DESCRIPTION OF SYMBOLS 1 pulley
2, 30 conveyor belt
2a, 30a front-side surface of conveyor belt
3 rubber magnet
3a inner side end of diagonal portion
3b outer side end of diagonal portion
4 magnetic sensor
5 reinforcement of conveyor belt
6 scraper
7 width direction guide
8 thickness direction guide
9 transmitter
10 on-site operation control unit
11 receiver
12 output terminal
13 central control unit
20 arithmetic section
21 diagonal portion of rubber magnet
22 parallel portion of rubber magnet
31 trigger magnet
32 reference magnet
33 arithmetic section
34 conveyor frame
34a sensor fixing frame
33a sensor cable
s, a, b, c output waveform

The invention claimed is:

1. A conveyor belt wear detection apparatus, comprising:
a rubber magnet embedded in a conveyor belt;
a magnetic sensor which is disposed in proximity to a front-side surface forming an outer peripheral surface of the conveyor belt and detects a magnetic field from the rubber magnet; and
an arithmetic section for estimating, based on a signal from the magnetic sensor, a wear amount on the front-side surface of the conveyor belt,
wherein the rubber magnet extends in a conveyor belt width direction and includes a diagonal portion in a plate shape and a parallel portion in a plate shape which are both magnetized in a thickness direction, the diagonal portion linearly extending, in section in a conveyor belt length direction, from an outer side end, which is closer to the front-side surface, to an inner side end, which is away from the front-side surface, while being at an angle to the front-side surface, the parallel portion being formed continuously from the inner side end of the diagonal portion and being arranged parallel to the front-side surface, and
wherein the arithmetic section estimates a wear amount of the conveyor belt upon detection of a magnetic field, based on a ratio ($Rx/R0$) of a waveform width $Rx$ to an initial waveform width $R0$, in which the waveform width $Rx$ is obtained, in a time variation pattern of a magnetic field detected by the magnetic sensor, at a threshold value predetermined as a specific sensor output value and the initial waveform width $R0$ is obtained at the threshold value in a time variation pattern detected for the conveyor belt that has not been subjected to wear.

2. The conveyor belt wear detection apparatus according to claim 1, wherein the diagonal portion is disposed so that the inner side end comes ahead of the outer side end with respect to a conveyor belt transport direction.

3. The conveyor belt wear detection apparatus according to claim 1, further comprising a reference magnet for correcting a waveform width of an output waveform detected by the rubber magnet, the reference magnet being disposed either on the front side or on the rear side of the rubber magnet in a conveyor belt transport direction.

4. The conveyor belt wear detection apparatus according to claim 1, wherein the rubber magnet is formed of magnetic powder which is dispersed in a rubber material matrix and magnetized.

* * * * *